United States Patent Office 3,523,962
Patented Aug. 11, 1970

3,523,962
PROCESS FOR PREPARING ORGANIC ISOCYANATES
Gerhard F. Ottmann and Ehrenfried H. Kober, Hamden, and David F. Gavin, Cheshire, Conn., assignors to Olin Corporation, a corporation of Virginia
No Drawing. Filed Apr. 6, 1967, Ser. No. 628,821
Int. Cl. C07b 29/00; C07c 119/04
U.S. Cl. 260—453    11 Claims

ABSTRACT OF THE DISCLOSURE

A process for providing an organic isocyanate by the reaction of an organic nitro compound with carbon monoxide in the presence of a catalytic system comprised of a mixture of a noble metal base compound and an organophosphorus compound.

---

This invention relates to the preparation of organic isocyanates from organic nitro compounds.

Organic isocyanates are well-known items of commerce and are currently being provided commercially in very large quantities. They are especially useful and valuable in the preparation of urethane coatings, fibers, and foams. Many organic isocyanates have also been found to be valuable in the preparation of various areas and carbamates which have outstanding properties in the pesticidal area. Other uses and applications of organic isocyanates are well known to those skilled in this art.

A variety of methods are known for the preparation of organic isocyanates. However, the commercial process for preparing these derivatives utilizes the catalytic hydrogenation of an organic nitro compound to form the corresponding primary amine, followed by reaction of the primary amine with phosgene to form the corresponding isocyanate. This conventional twwo-step process involves complex and expensive equipment, and the use of the extremely corrosive phosgene is a particularly undesirable process feature. It has been evident to those familiar with this art that a simplified process for the preparation of organic isocyanates is desirable and would be a valuable contribution to the art.

In order to provide a simplified technique for the preparation of organic isocyanates, it has been proposed to react organic nitro compounds with carbon monoxide in the presence of a catalyst. For example, British Pat. No. 1,025,436 discloses a process for preparing organic isocyanates from the corresponding organic nitro compounds by reacting an organic nitro compound at an elevated temperature and an elevated pressure with carbon monoxide in the presence of a noble metal based catalyst. This process is not suitable for commercial adaptation because no more than trace amounts of organic isocyanates are formed when an organic nitro compound such as dinitrotoluene is reacted with carbon monoxide at elevated temperature and pressure using a noble metal based catalyst, such as rhodium trichloride, palladium dichloride, iridium trichloride, osmium trichloride, palladium oxide, and the like.

Other proposed simplified techniques utilize other catalyst systems. For example, Belgium Pat. No. 672,405 describes the use of a catalyst system of a noble metal and/or a Lewis acid in the reaction between an organic nitro compound with carbon monoxide to provide an organic isocyanate.

Unfortunately, the yield or organic isocyanate afforded by these proposed simplified techniques has not been significant enough to justify their use on a commercial scale.

It is a primary object of this invention to provide an improved process for the prepartion of organic isocyanates.

Another object of this invention is to provide an improved one-step process for the direct conversion of organic nitro compounds to organic isocyanates.

Still another object of this invention is to provide a process for the direct conversion of aromatic nitro compounds to aromatic isocyanates in good yield.

Other objects of the invention will be apparent from the following detailed description thereof.

These objects have been accomplished in accordance with the invention disclosed herein. It has now been found that, in the reaction wherein organic isocyanates are obtained from organic nitro compounds by reaction with carbon monoxide in the presence of a noble metal based catalysis, isocyanate yields are significantly improved by employing selected organophosphorus compounds as catalysts concurrently with the aforementioned noble metal based catalysts. Thus, the process of this invention utilizes a catalytic system comprising at least one noble metal based compound and at least one of the selected organophosphorus compounds disclosed herein. Among the organophosphorus compounds which are particularly suitable as catalyst components in the process disclosed herein are certain phosphines, phosphites, and organophosphonium halides.

The efficacy of the aforementioned catalytic systems in providing significantly improved yields of isocyanates is applicable to the preparation of any of the isocyanates capable of being prepared by the reaction of organic nitro compounds with carbon monoxide using a noble metal based catalyst. The process of this invention can be utilized in the conversion of aromatic, cycloaliphatic, aliphatic, and heterocyclic mono- or polynitro compounds to organic isocyanates in good yields. Thus, the term "organic nitro compounds" as used herein represents substituted as well as unsubstituted nitro derivatives, since in general or other substituents on the organic nitro reactants do not inhibit completely the reaction of carbon monoxide with the nitro groups under the conditions of the process disclosed here. Some substituents may also react with the CO concurrently with the nitro groups, and other substituents may impede or retard the desired reaction; but invariably some formation of isocyanate occurs under the process albeit at a reduced rate or in lower yield.

Among the organic nitro compounds which may be utilized in the process disclosed herein are: the aromatic nitro compounds including, for instance, nitrobenzene, nitronaphthalenes, nitroanthracenes, nitrobiphenyls, bis (nitrophenyl) methanes, bis(nitrophenyl)ethers, bis(nitrophenyl)thioether, bis(nitrophenyl)sulfones, nitrodiphenoxy alkanes, and nitrophenothiazines; the nitrocycloalkanes including, for instance, nitrocyclobutane, nitrocyclopentane, nitrocyclohexane, dinitrocyclohexanes, and bis(nitrocyclohexyl)methanes; the nitroalkanes including, for instance, nitromethane, nitroethane, nitropropane, nitrobutanes, nitrohexanes, nitrooctanes, nitrooctadecanes, dinitroethane, dinitropropanes, dinitrobutanes, dinitrohexanes, dinitrodecanes, phenyl nitromethane, bromophenyl nitromethanes, nitrophenyl nitromethanes, methoxy phenyl nitromethanes, bis-(nitromethyl)cyclohexanes, and bis-(nitromethyl)benzenes.

As mentioned in the above discussion, organic nitro compounds having additional substituents may also be employed in the process described herein. For instance, the aforementioned compounds may be substituted with one or more additional substituents such as nitro, nitroalkyl, alkyl, alkoxy, aryloxy, halogen, alkylthio, arylthio, carboxyalkyl, cyano, isocyanato, and the like and employed as reactants in the novel process of this invention. Thus, included among the suitable organic nitro compounds which may be converted to isocyanates utilizing the process of this invention are: o-nitrotoluene, m-nitrotoluene, p-nitrotoluene, o-nitro-p-xylene, 2-methyl-1-nitronaphthalene m-dinitrobenzene, p-dinitrobenzene, 2,4-dinitrotoluene, 2,6-dinitrotoluene, dinitromesitylene, 4,4′-dinitrobiphenyl, 2,4-dinitrobiphenyl, 4,4′-dinitrobibenzyl, bis(p-nitrophenyl)methane, bis(2,4-dinitrophenyl)methane, bis(p-nitrophenyl)ether, bis(2,4 - dinitrophenyl)ether, bis(p - nitrophenyl)thioether, bis(p-nitrophenyl)sulfone, bis(p-nitrophenoxy)ethane, α,α-dinitro - p - xylene, 2,4,6-trinitrotoluene, 1,3,5-trinitrobenzene, 1-chloro-2-nitrobenzene, 1-chloro-4-nitrobenzene, 1-chloro-3-nitrobenzene, 2-chloro-6-nitrotoluene, 4-chloro-3-nitrotoluene, 1-chloro-2,4-dinitrobenzene, 1,4-dichloro-2-nitrobenzene, alpha-chloro-p-nitrotoluene, 1,3,5-trichloro-2-nitrobenzene, 1,3,5-trichloro-2,4-dinitrobenzene, 1,2-dichloro-4-nitrobenzene, alpha-chloro-m-nitrotoluene, 1,2,4-trichloro-5-nitrobenzene, 1-bromo-4-nitrobenzene, 1-bromo-2-nitrobenzene, 1-bromo-3-nitrobenzene, and 1-bromo-2,4-dinitrobenzene.

Also, included among the suitable organic nitro compounds which may be employed are: α,α-dibromo-p-nitrotoluene, α-bromo-p-nitrotoluene, 1-fluoro-4-nitrobenzene, 1-fluoro-2,4-dinitrobenzene, 1-fluoro-2-nitrobenzene, o-nitrophenyl isocyanate, m-nitrophenyl isocyanate, p-nitrophenyl isocyanate, o-nitroanisole, p-nitroanisole, p-nitrophenetole, o-nitrophenetole, 2,4-dinitroanisole, 1-chloro-2,4-dimethoxy-5-nitrobenzene, 1,4-dimethoxy-2-nitrobenzene, m-nitrobenzaldehyde, p-nitrobenzaldehyde, p-nitrobenzoylchloride, m-nitrobenzoylchloride, 3,5-dinitrobenzoylchloride, ethyl-p-nitrobenzoate, methyl-o-nitrobenzoate, m - nitrobenzenesulfonylchloride, p-nitrobenzenesulfonylchloride, o-nitrobenzenesulfonylchloride, 4-chloro-3-nitrobenzenesulfonylchloride, 2,4 - dinitrobenzenesulfonylchloride, 3-nitrophthalic anhydride, p-nitrobenzonitrile, m-nitrobenzonitrile, 1,4-dinitrocyclohexane, bis(p-nitrocyclohexyl)methane, 1-nitro-n-hexane, 2,2-dimethyl-1-nitrobutane, 1,6-dinitro-n-hexane, 1,4-bis(nitromethyl)cyclohexane, 3,3′-dimethoxy-4,4′-dinitrobiphenyl, and 3,3′-dimethyl-4,4′-dinitro-biphenyl.

Isomers and mixtures of the aforesaid organic nitro compounds and substituted organic nitro compounds may also be utilized in the practice of this invention as well as homologues and other related compounds. Generally, the starting nitro compound reactants contain between 1 and about 20 and preferably below about 14 carbon atoms. Compounds which have both nitro and isocyanato substituents may also be employed as reactants. It has been found that during the conversion of polynitro compounds to organic isocyanates using the process disclosed herein, considerable amounts of this type of compound are provided along with the polyisocyanate products. Thus, for instance, in the conversion of dinitrotoluenes to the corresponding diisocyanates, it has been found that compounds such as 2-isocyanato-4-nitrotoluene are also isolated. Since the process of this invention is conveniently adaptable to batchwise, semi-continuous or continuous operations, the nitro-isocyanato derivative may be utilized as a starting reactant in a new batch operation or may simply be directly converted to 2,4-toluene diisocyanate by recycling in a continuous practice of this process.

The process of this invention is particularly effective in the conversion of aromatic nitro compounds to organic isocyanates. As used herein the term "aromatic nitro compounds" represents those organic compounds having at least one nitro group attached directly to an aromatic nucleus such as benzene, naphthalene and the like wherein the aromatic nucleus may also contain other substituents as, for instance, illustrated in the preceding discussion. Among the preferred organic nitro compounds which may be used in the practice of this invention are the nitrobenzenes, both mono- and polynitro including isomeric mixtures thereof; the alkylnitrobenzenes including the various nitrated toluenes and the nitrated xylenes; nitrated biphenyl and nitrated diphenylmethane. Other preferred reactants which can be particularly mentioned include the bis-(nitrophenoxy)alkanes and the bis(nitrophenoxy) alkyl ethers.

At least one noble metal based catalyst must be employed in conjunction with the required organophosphorous compound in the practice of this invention. As used herein, "noble metal based catalyst" represents one of the elements palladium, ruthenium, rhenium, rhodium, osmium, gold, platinum or iridium and compounds of these elements such as their oxides, halides, sulfates, nitrates, cyanides, carbonyls, carbonyl halides, and so forth. Mixtures of such noble metal based catalysts may be employed if so desired.

While the improved yields of organic isocyanates are provided by the use of the selected organophosphorus compounds in combination with any of the above-identified noble metal based catalysts, particularly beneficial results have been observed when the noble metal halides are utilized in the catalytic system of this invention. Several of the metals may exist in more than one valence state in compounds of this sort (e.g., $PtCl_2$, $PtCl_4$), and thus it is understood that this preferred class of noble metal halide catalyst is broad enough to cover such compounds.

Included among the preferred catalysts which may be used are, for instance: palladium dibromide, palladium dichloride, palladium difluoride, palladium trifluoride, palladium diiodide, rhodium tribromide, rhodium trichloride, rhodium trifluoride, rhodium tetrafluoride, rhodium, dichloride, ruthenium dichloride, ruthenium trichloride, ruthenium tetrachloride, rhenium chlorides, osmium dichloride, osmium trichloride, osmium tetrachloride, platinum dibromide, platinum tetrabromide, platinum dichloride, platinum tetrachloride, iridium trichloride, palladium monoxide (PdO), rhodium sesquioxide ($Rh_2O_3$), rhodium dioxide ($RhO_2$), ruthenium dioxide, ruthenium tetraoxide, osmium dioxide, osmium tetraoxide, and platinum oxide. The halides of palladium, rhodium, iridium, rhenium, and platinum are particularly preferred components in the catalytic system, since they can be utilized in combination with the selected organophosphorus compounds to provide excellent ultimate yields of organic isocyanates.

Usually, the noble metal based catalysts are employed in an amount of at least .001 molar percent based on molar amount of organic nitro compound utilized as reactant. However, the amount of catalyst employed can be varied considerably depending on the particular reaction mixtures and apparatus utilized in the isocyanate preparations. Generally, a convneient amount of noble metal based catalyst utilized is in the range of about 0.05–15.0 molar percent based on molar amount of organic nitro compound.

As mentioned in the preceding discussion, the improvement represented by the process of this invention relates to the use of selected organohposphorus compounds in conjunction with the noble metal based catalysts. For instance, selected phosphines have been found to be particularly efficacious when used in this process. Thus, tertiary phosphines wherein the phosphorus atom is bonded to three aromatic moieties such as phenyl, naphthyl, and the like are suitable for use in the practice of this invention in contrast to other tertiary phosphines wherein, for example, an alkyl group is attached directly to the phosphorus atom. Similarly, primary and secondary phosphines are not suitable for use in this invention. The aryl substituents on the useful tertiary phosphines may also be substituted with one or more other groups such as halogen including fluorine, chlorine, bromine, iodine; alkyl; alkoxy; aryloxy, and the like; and thus it is understood that the term "triaryl phosphine" as used herein refers to phosphines wherein the aryl groups may be either unsubstituted or substituted. Illustrative of the triaryl phosphines which may be utilized in the practice of this invention are: triphnyelphosphine, tris(2-chloropheynl) phosphine, tris(3-chlorophenyl)phosphine, tris(4-chlorophenyl)phosphine, tris(2-methoxyphenyl)phosphine, tris-(3 - methoxyphenyl)phosphine, tris( 4- methoxyphenyl) phosphine, tris(4-phenoxyphenyl) phosphine, trio(o-tolyl) phosphine, tri(m-tolyl)phosphine, tri(p-tolyl)phosphine, tris(2,4 - dimethylphenyl)phosphine, tris (2,5 -dimethylphenyl)phosphine, tris (2,4,5 - trimethylphenyl)phosphine, tris(2,4,6 - trimethylphenyl)phosphine, tris(2-biphenyl)phosphine, tris(4-biphenyl)phosphine.

The use of the triarylphosphines in catalyic combination with the noble metal based catalysts is generally accomplished by adding the phosphines and the noble metal based catalyst separately to the reaction system. However, it has also been determined that noble metal triarylphosphine halides and noble metal triarylphosphine carbonyl halides can be utilized very effectively as the catalytic system in the conversion of the nitro compounds to isocyanates with carbon monoxide. These halides are conveniently prepared by the reaction of the triarylphosphines with the previously recited noble metal halides such as exemplified in Example 1 herein where rhodium triphenylphosphine chloride was prepared and utilized as the required catalyst system. Thus, it is to be understood that in the practice of this invention the use of phosphines in combination with the use of the noble metal based component may involve either the separate addition of each to the reaction system or, if desired, the prior formation of the noble metal triarylphosphine halide and subsequent use thereof in the reaction.

Certain organophosphonium halides are also advantageously employed in the process described herein. Specifically triarylalkylphosphonium halides of the formula:

are particularly useful in the practice of this invention. Preferred halides are the bromides and chlorides. These halides are readily provided by methods known to those skilled in this art as, for instance, by the reaction of triarylphosphines, as previously defined herein, with alkyl halides wherein the alkyl group may or may not be substituted by other groups such as hydrogen, alkyl, aryl, carboxyalkyl, cyano, and the like (represented by R' in above formula). As used in the specification and claims, it is understood that the term "triarylalkylphosphonium halides" covers those compounds wherein the alkyl substituent therein may be substituted by other groups. Included among the triarylalkylphosphonium halides which may be utilized in the practice of this invention are: triphenylmethylphosphonium chloride, triphenylmethylphosphonium bromide, triphenylethylphosponium bromide, triphenylethylphosphonium iodide, triphenylethylphosphonium chloride, triphenylpropylphosphonium iodide, triphenylpropylphosphonium bromide, triphenylpropylphosphonium chloride, triphenyl-(3-bromopropyl) phosphonium bromide, triphenylbutylphosphonium bromide, triphenyl(acetylmethyl) phosphonium chloride, triphenyl(acetylmethyl)phosphonium bromide, triphenylmethoxymethylphosphonium chloride, triphenylisopropylphosphonium chloride, triphenylisopropylphosphonium bromide, triphenylisobutylphosphonium chloride, triphenylisobutylphosphonium bromide, triphenylisobutylphosphonium chloride, triphenylchloromethylphosphonium chloride, triphenylbenzylphosphonium chloride, triphenylbenzylphosphonium bromide, triphenyl(diphenylmethyl)phosphonium chloride, triphenyl(diphenylmethyl) phosphonium bromide, triphenyl (benzoylmethyl) phosphonium chloride, triphenyl (benzoylmethyl) phosphonium bromide, triphenyl - (carbethoxymethyl) phosphonium bromide, o-xylylenebis - (triphenylphosphoniumbromide), p - xylylenebis - (triphenylphosphoniumbromide), tris (4-tolyl) methyl phosphonium chloride, tris (4 - tolyl) carbethoxymethyl phosphonium chloride, tris (4 - tolyl) acetylmethyl phosphonium chloride, tris (4-tolyl) acetylmethyl phosphonium bromide, tris (4-tolyl)benzoylmethyl phosphonium chloride, tris(4-tolyl) benzoylmethyl phosphonium bromide, tris(4-biphenyl) carbethoxymethyl phosphonium chloride, and tris(4-biphenyl) benzyl phosphonium bromide.

Other organophosphorus compounds which may be utilized in the practice of this invention are selected phosphites specifically trialkylphosphites and triarylphosphites. The alkyl and aryl substituents of such phosphites may also contain additional substituents such as halogen, alkyl, alkoxy, and the like without affecting the usefulness of these materials in obtaining the improved results provided by this invention, since the only requirement is that the useable phosphites contain three P-O-C bonds. Thus, as used herein, the terms "trialklyphosphites" and "triarylphosphites" represent unsubstituted trialkyl- and triarylphosphites as well as those phosphites of the same type wherein the alkyl and aryl substituents carry additional groups. Particularly useful phosphites are trialkylphosphites wherein each alkyl group contains 1-8 carbon atoms and triphenylphosphite, and substituted derivatives of such phosphites as previously mentioned. Illustrative of phosphites which may be used in the practice of this invention are: trimethylphosphite, triethylphosphite, diethyl - (2-chloroethyl) phosphite, ethyl-di(2-chloroethyl) phosphite, tri - (2-chloroethyl) phosphite, tri - (2-bromoethyl) phosphite, tri - (2-methoxyethyl) phosphite, tripropylphosphite, triisopropylphosphite, tributylphosphite, triisobutylphosphite, triisoamylphosphite, phenyl di (2 - chloroethyl) phosphite, diphenyl - (2 - chloroethyl) phosphite, diphenylpropylphosphite, diphenylbutylphosphite, triphenylphosphite, diphenyl - (2 - chlorophenyl) phosphite, tri (4 - chlorophenyl) phosphite, tri-(2 - methoxyphenyl) phosphite, tri (4 - nitrophenyl) phosphite, diphenyl - (p - tert - butylphenyl) phosphite, phenyl - bis (p - tert -butylphenyl) phosphite, tri- (2 - methylphenyl) phosphite, tri - (3 - methylphenyl) phosphite, tri - (4 - methylphenyl) phosphite, tri (4 - tert-butylphenyl) phosphite and tri - biphenylphosphite.

While the use of even traces of the aforementioned organophosphorus compounds in combination with the noble metal based catalysts begins to provide improved yields of isocyanates, best results have been obtained when the selected organophosphorus compounds are utilized in an amount of 0.05-15.0 molar percent based on molar amount of organic nitro compound, and therefore this is a preferred concentration range. Greater amounts of these compounds may be utilized if desired, but no substantial improvement in yield is obtained as a result of such additional increments.

The catalyst system of this invention can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The previously reported reactions of carbon monoxide with organic nitro compounds using a noble metal based catalyst to provide isocyanates were performed at elevated pressure and at an elevated temperature range, and the improved process of this invention utilizing the selected organophosphorus compounds is carried out in a similar manner.

Thus, the process described herein can be performed at a reaction temperature of at least 60° C., and a preferred temperature range of about 125°–250° C. is generally employed. Higher temperatures can be employed, but decomposition of either reactants or product begins to occur at such higher levels, and thus it is preferred not to operate at these temperature levels. Interior and/or exterior heating and cooling means may be utilized to maintain the temperature within the reactor within the desired range.

The process must be carried out at elevated pressure, and it has been determined that the pressure within the reactor must be at least 30 p.s.i. although reactors pressurized up to 50,000 p.s.i. or even higher may be utilized. Generally, the process of this invention can be performed using a preferred pressure range of about 500–8000 p.s.i.

The process of this invention operates effectively in the absence of a solvent, but improved overall yields of the organic isocyanates can be obtained when a solvent which is chemically inert to the components of the reaction system is employed. Suitable solvents include halogenated aliphatic and aromatic hydrocarbons such as dichloromethane, tetrachloroethane, monochloronaphthalene, monochlorobenzene, dichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

Since the process described herein requires elevated pressure conditions, the reactions must be carried out in an autoclave or any other high pressure reactor. Preferably the pressure vessel is equipped with stirring or rocking means. The order of mixing the reactants is not critical and may be varied within the limitations of the equipment employed. In one typical embodiment, the organic nitro compound, the noble metal based catalyst, and the selected organophosphorus compound and, if desired, solvent are charged to a stirrer-equipped autoclave which was previously purged with nitrogen. Carbon monoxide is fed into the autoclave until the desired pressure is provided which as mentioned must be at least 30 p.s.i. There should be at least three moles of carbon monoxide used per nitro group in the organic nitro reactant, but it is advantageous to use molar excesses of monoxide in order to provide the high pressures required for isocyanate formation. If desired, additional carbon monoxide can be added to the autoclave either intermittently or continuously as the reaction progresses. The highest carbon monoxide requirements are generally utilized in a process in which the carbon monoxide is added continuously, but suitable recycle of the carbon monoxide containing gas streams greatly reduces the overall consumption of carbon monoxide.

The autoclave contents are heated at the previously disclosed temperature range wherein isocyanate formation occurs. Reaction periods vary depending upon the particular reactant and catalyst employed, but, in general, between one-half hour and eighteen hours are required for completion of the reaction. Obviously, the pressure selected also is a factor in reaction times, and thus reaction can be completed in shorter or longer periods depending upon pressure conditions.

When reaction is complete, the autoclave is generally cooled to ambient temperature prior to venting and removal of the crude reaction product. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, freezing, etc., may be employed to separate the organic isocyanate from the unreacted organic nitro compound and any by-products that may be formed. All the above-illustrated separation techniques may be carried out continuously.

The following examples are presented to further illustrate the invention without any intention of being limited thereby. All percentages are by weight unless otherwise specified.

EXAMPLE 1

Triphenylphosphine rhodium chloride was prepared in the following manner. Rhodium trichloride and triphenylphosphine in a molar ratio of 1:2 were refluxed in ethanol for two hours, and after the reaction mixture was cooled, the complex crystallized from solution as beautiful red crystals which were filtered and dried.

A 300 ml. rocking autoclave was charged with 40 g. of nitrobenzene and 1.0 g. of rhodium triphenylphosphine chloride, $Rh[P(C_6H_5)_3]_3Cl_3$. The reactor was purged with dry nitrogen and then pressurized with carbon monoxide to an initial pressure of 1160 p.s.i.g. The reaction mixture was heated for two hours at 200° C. After cooling to room temperature, the reaction mixture was filtered, distilled, and the composition of the distillate analyzed by vapor phase chromatography. A 40% yield of phenylisocyanate was obtained.

EXAMPLE 2

Under the conditions of Example 1, 40 g. of nitrobenzene were heated in a carbon monoxide atmosphere (1275 p.s.i.g. initial CO-pressure) in the presence of 1.0 g. of rhodium trichloride. Analysis of the reaction product by vapor phase chromatography did not give evidence for the formation of phenylisocyanate.

EXAMPLE 3

A mixture consisting of 40 g. of nitrobenzene, 5.0 g. of rhodium trichloride, and 1.0 g. of triphenylphosphine was heated in a rocking autoclave for two hours at 200° C. and under an initial carbon monoxide pressure of 1350 p.s.i.g. The reaction product which was worked up and analyzed as described in Example 1 contained phenylisocyanate amounting to a 34% yield.

EXAMPLE 4

Triphenylphosphine and ethylbromoacetate were reacted in equimolar quantities in ethereal solution. A precipitate formed which was filtered and dried. The resulting white powder was triphenylcarbethoxymethylphosphonium bromide, $[(C_6H_5)_3PCH_2COOC_2H_5]^+Br$.

Under the conditions described in Example 1, 40 g. of nitrobenzene were reacted with carbon monoxide (1310 p.s.i.g. initial pressure) in the presence of 0.5 g. of rhodium trichloride and 1.0 g. triphenylethoxyacetyl phosphonium bromide. This reaction afforded pure phenylisocyanate in a 55% yield.

EXAMPLE 5

A 100 ml. rocking autoclave was charged with 6.0 g. of nitrobenzene, 0.06 g. of rhenium trichloride, and 0.6 g. of triphenylphosphine. The reactor was purged with dry nitrogen and then pressurized with carbon monoxide to an initial pressure of 1200 p.s.i.g. The reaction mixture was heated for 1.5 hours at 190° C. After cooling to room temperature, the reaction mixture was filtered and distilled. Analysis of the distillate by vapor phase chromatography revealed that phenyl isocyanate had been obtained in 24.4% yield.

EXAMPLE 6

A 100 ml. rocking autoclave was charged with 6.0 of nitrobenzene, 0.06 g. of platinum dichloride, and 0.6 g. of triphenylphosphine. The reactor was purged with dry nitrogen and then pressurized with carbon monoxide to an initial pressure of 1200 p.s.i.g. The reaction mixture was heated for 1.5 hours at 190° C. After cooling to room temperature, the reaction mixture was filtered and distilled. Analysis of the distillate by vapor phase chromatography revealed that phenylisocyanate had been obtained in 16.1% yield.

The above example was repeated in exact detail except for the omission of the phosphine ingredient. Analysis of the resulting reaction mixture indicated that only a trace yield of phenylisocyanate had been obtained.

EXAMPLE 7

A 100 ml. rocking autoclave was charged with 6.0 g. of nitrobenzene, 0.06 g. of palladium dioxide, and 0.6 g. of triphenylphosphine. The reactor was purged with dry nitrogen and then pressurized with carbon monoxide to an initial pressure of 1200 p.s.i.g. The reaction mixture was heated for 1.5 hours at 190° C. After cooling to room temperature, the reaction mixture was filtered and distilled. Analysis of the distillate by vapor phase chromatography revealed that phenylisocyanate had been obtained in 9.4% yield.

The above example was repeated in exact detail except for the omission of the triphenylphosphine. Analysis of the resulting reaction mixture indicated that only a trace yield of phenylisocyanate had been obtained.

What is claimed is:

1. In the process for preparing an organic isocyanate by reacting an aromatic nitro compound containing up to fourteen carbon atoms with carbon monoxide at an elevated temperautre and an elevated pressure in the presence of a catalyst, the improvement which comprises employing as said catalyst, a catalyst system comprised of
    (I) a mixture of
        (A) a halide of palladium, rhodium, iridium, rhenium or platinum; or an oxide of palladium, rhodium or platinum; and
        (B) a triarylphosphine, trialkylphosphite, triarylphosphite or triarylalkylphosphonium halide; or
    (II) a metal triarylphosphine halide, said metal being palladium, rhodium, iridium, rhenium or platinum.

2. The process of claim 1 wherein a temperature range of about 125–250° C. is employed.

3. The process of claim 1 wherein a preferred pressure range of about 500–8000 p.s.i. is employed.

4. The process of claim 1 wherein said process is carried out in the presence of halogenated aliphatic hydrocarbon or halogenated aromatic hydrocarbon solvents.

5. The process of claim 1 wherein said catalyst system employed is a metal triarylphosphine halide, said metal being palladium, rhodium, iridium, rhenium or platinum.

6. The process of claim 5 wherein rhodium triphenylphosphine chloride is employed as said catalyst system.

7. The process of claim 1 wherein said catalyst system comprises a mixture of a halide of palladium, rhodium, iridium, rhenium or platinum with a triarylalkylphosphonium halide.

8. The process of claim 7 wherein said catalyst system comprises a mixture of rhodium trichloride and triphenylethoxyacetyl phosphonium bromide.

9. The process of claim 1 wherein said catalyst system comprises a mixture of a halide of palladium, rhodium, iridium, rhenium or platinum with a triarylphosphine.

10. The process of claim 9 wherein said triarylphosphine is triphenylphosphine.

11. The process of claim 9 wherein said halide and said phosphine are each employed in an amount of about 0.05–15.0 molar percent based on molar amount of aromatic nitro compound.

References Cited

UNITED STATES PATENTS 3,110,747  11/1963  Mullineaux _____ 260—580 XR
3,405,156  10/1968  Stern et al. _____ 260—453

CHARLES B. PARKER, Primary Examiner

D. H. TORRENCE, Assistant Examiner

U.S. Cl. X.R.

260—2.5, 77.5, 243, 346.3, 465, 469, 471, 543, 544, 590, 599, 606.5, 612, 644, 645, 646, 689, 950, 951, 954, 967; 252—437